L. J. WERNER.
IGNITION SWITCH.
APPLICATION FILED JUNE 23, 1917.
1,258,169.
Patented Mar. 5, 1918.
2 SHEETS—SHEET 1.
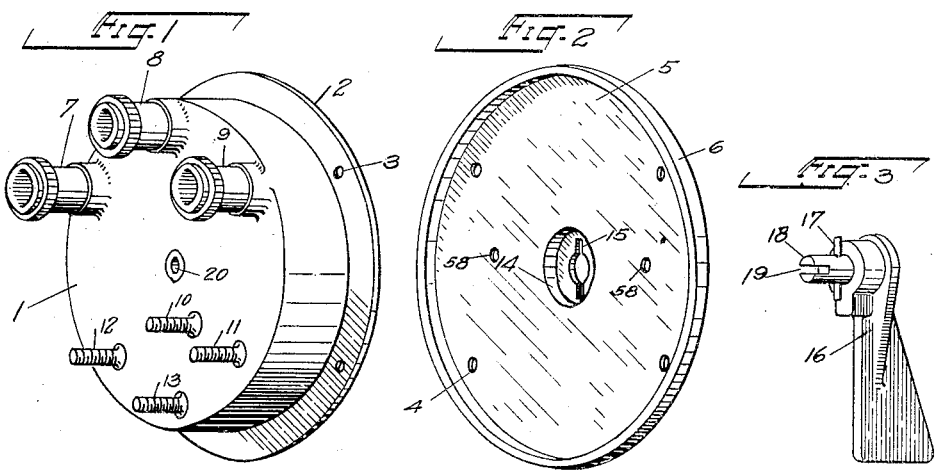
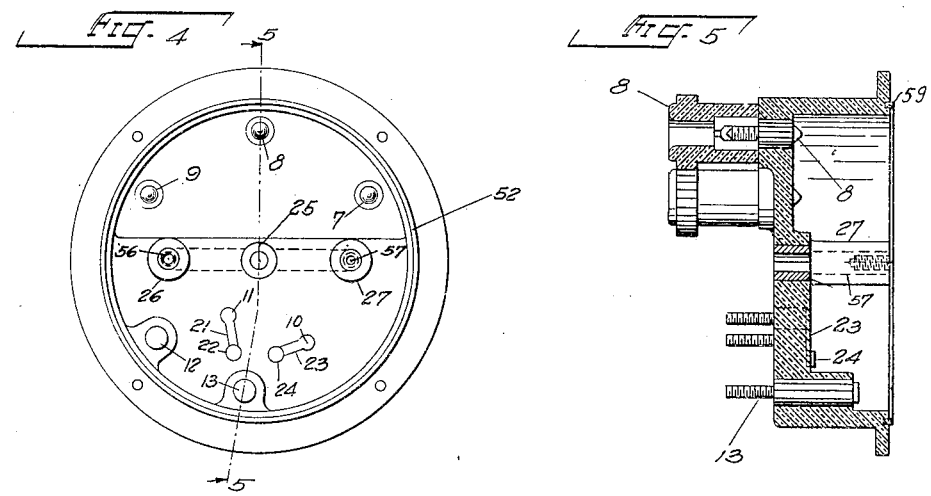
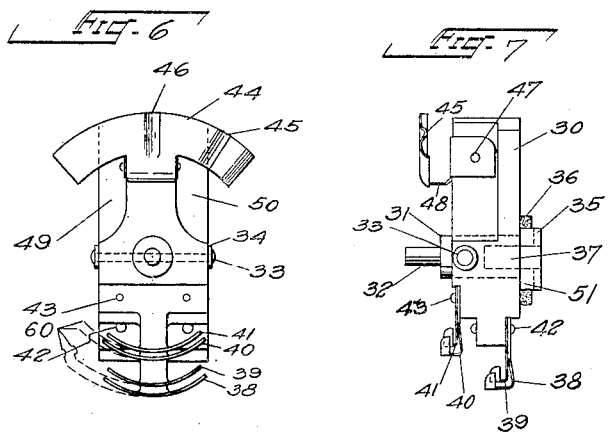
INVENTOR
LEO J. WERNER
Albion D. T. Libby
ATTORNEY

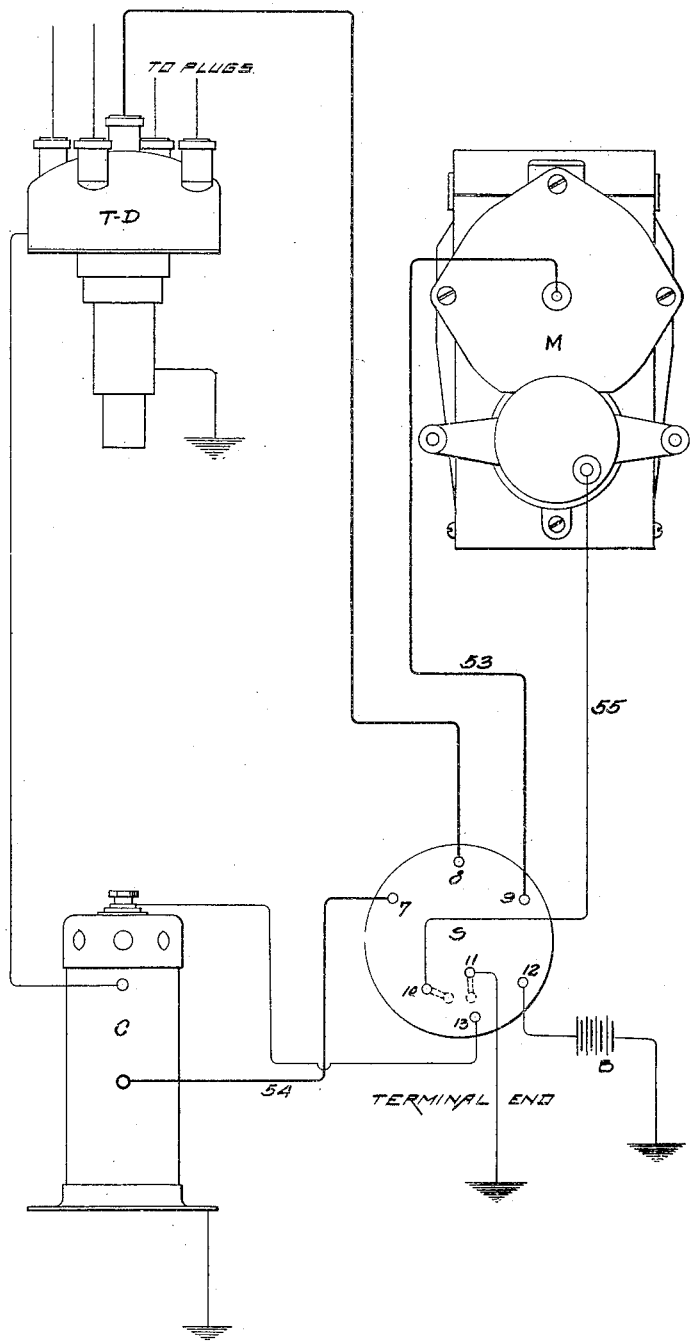
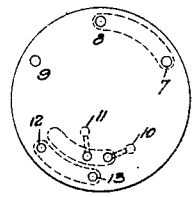
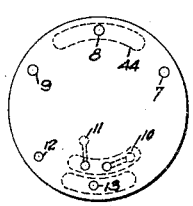
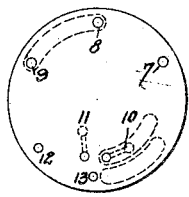

UNITED STATES PATENT OFFICE.

LEO J. WERNER, OF NEWARK, NEW JERSEY, ASSIGNOR TO SPLITDORF ELECTRICAL COMPANY, OF NEWARK, NEW JERSEY.

IGNITION-SWITCH.

1,258,169.  Specification of Letters Patent.  Patented Mar. 5, 1918.

Application filed June 23, 1917. Serial No. 176,533.

*To all whom it may concern:*

Be it known that I, LEO J. WERNER, a citizen of Russia, and a resident of Newark, in the county of Essex and State of New Jersey, have invented certain new and useful Improvements in Ignition-Switches, of which the following is a specification.

My invention relates to improvements in an ignition switch particularly to one that is adapted for use in a dual or duplex system, including the use of a battery, induction coil and distributer and a high tension magneto. In such a combination system it is highly advantageous to control both the low tension or primary circuit for both the battery system and the magneto as well as the high tension leads from the magneto and battery system.

It is the object of my invention to provide a switch suitable for this work which will be small, compact, simple in construction and cheap to manufacture.

In designing a switch used for controlling both the low tension and high tension circuits much care must be exercised in the disposition and arrangement of parts so that trouble will not be encountered by the incorporation of the high tension circuits in the same structure with the low tension circuits.

In the drawings, Figure 1 is a perspective view of the back of the switch.

Fig. 2 is a perspective view of the front cover.

Fig. 3 is a view of the handle for operating the moving parts.

Fig. 4 is a front elevation of Fig. 1.

Fig. 5 is a sectional view on the line 5—5 of Fig. 4.

Fig. 6 is a view of the movable member carrying the switch blades.

Fig. 7 is a side elevation of Fig. 6.

Fig. 8 illustrates, on a reduced scale, the position of the switch blades with reference to the stationary contacts shown in Fig. 4, when the switch is thrown to include the battery system and to cut out the magneto.

Fig. 9 is a view like Fig. 8 but with the switch blades in position to cut both the battery and magneto off.

Fig. 10 is a view like Fig. 8 with the switch blades positioned to leave the magneto in working position but cut the battery system off.

Fig. 11 is a diagrammatic view of a du-
plex ignition system in which my switch is to be used.

Referring now particularly to the various views, in which like numbers refer to corresponding parts, 1 is a switch casing having a rim 2 with holes 3 therein for the reception of screws passing through holes 4 of the cover 5 for holding the casing onto the dashboard or other support. The rim 6 of the cover is adapted to fit over the rim 2. The switch casing 1 has an annular groove 52 for the reception of a felt ring shown at 59 for keeping out dust, dirt and moisture, etc., which is put in place before the cover 5 is placed in position. 7, 8 and 9 illustrate terminal connectors used for the high tension leads. The inner portions of the terminals 7, 8 and 9 preferably terminate in rounded ends, as shown in Figs. 4 and 5, for the purpose hereinafter explained. Mounted on the switch casing 1 are terminals 10, 11, 12 and 13 which are shown in Fig. 1 without any nuts or fastening means for the wires to be attached thereto, preferably the terminals 7 to 13 inclusive are molded into the casing 1 when this is made. The interior ends of the terminal studs 10 and 11 are connected by metallic strips 23 and 21 to enlarged flat connectors 24 and 22 respectively on which a movable switch blade, hereinafter referred to, operates. The use of the connectors 23 and 21 are essential, in order to spread the terminal posts 10 and 11 far enough apart on the back of the switch casing 1 so that the wires may be readily connected thereto. 26 and 27 are stops for the movable switch member preferably molded integral with the casing 1 and having metal inserts 56 and 57 for the reception of screws passing through holes 58 in the cover 5 to hold the same in place. A special insert extending across from stop 26 to stop 27 including thimble 25 may be used as shown in dotted line, Fig. 4, or the metallic bushing 25 may be molded separate and have a hole 20 therethrough to receive the end 32 of stud 31 (shown in Fig. 7) on which is mounted, by means of rivets 33 and washers 34 an insulator block 30. The opposite end of stud 31 from the reduced portion 32 is bored out at 37 for the reception of switch stud 18 which is split at 19 so that the two limbs thereof may be spread whereby the stud 18 will make a snug fit with the bore 37. Slot 35 is also cut in the end of stud 31 for the reception of pin 17 carried on the switch stud 18. When the switch block 30 is placed in the switch casing 1, as above described, the outer head 51 of stud 31 is adapted to fit within the recess 14 of the switch cover 5, a washer 36 preferably of felt, being placed there around for the purpose of keeping out dust, and dirt, etc.

It will be seen that when the switch handle 16 is manipulated so as to pass the pin 17 through the slot 15 of cover 5 it will also aline with the slot 35 in stud 31 so that the switch block 30 may be moved by the operation of handle 16. It will also be noted that the handle 16 cannot be removed from the switch except in one position which is the off position illustrated in Fig. 9.

The switch block 30 carries on the top a switch blade 44 which has depressions 45 and 46 formed therein to coact with the rounded ends of the studs 7 and 8 whereby the correct location of the switch may be felt as the handle 16 is operated. The switch blade 44 is connected in any suitable manner to the block 30 such as by rivets 47. The blade 44 is preferably curved downward and upward as indicated at 48 so as to get a good spring action on the blade 44.

The lower part of the block 30 carries two groups of arcuate switch blades of a special shape. One set of these switch blades are illustrated as 38 and 39 to be held to the block 30 by rivets 42. This set of switch blades are adapted to coact with the contact studs 12 and 13 as will be seen by reference to Figs. 8 and 10 inclusive, and the second group of switch blades 40 and 41 are connected to the block 30 by rivets 43. It will be noted from Figs. 6 and 7 that the blades 38 to 41 inclusive are so shaped and formed as to produce relatively sharp edges which operate on the contact studs 12 and 13 and 10 and 12. The outer ends of the arcuate blades are preferably formed from a different center than the central portion as will be indicated by the dotted lines 60 shown in Fig. 6. The ends being thus on a different arc than the central portion blades there is produced on the respective contact studs a scraping action as the switch is operated, thus insuring good contact which is particularly advantageous in the battery circuit. It will also be noted that the blades 38 and 40 are formed to set slightly forward, as indicated in Fig. 7, of the blades 39 and 41 in order to compensate for the extra distance they are away from the center of rotation of the movable member 30. The switch blade 44 and blades 38 to 41 inclusive are preferably of such a length and arranged on the block 30 so that the low tension circuits are operated previous to the switching of the high tension leads 53 and 54 to or from the contact 8 leading to the distributer so that no high tension arc is produced inside the switch. These features of construction of the low tension switch blades form an important part of my invention.

In Fig. 11, C illustrates an induction coil, B the battery and S the high tension switch, M a high tension magneto and T—D the timer-distributer. It will be noted that the high tension lead 53 runs from the magneto to the switch contact 9. The high tension lead of the coil C is connected by wire 54 to terminal 7 while terminal 8 of the switch connects to the distributing finger of the distributer T—D. Wire 55 connects the insulated end of the low tension winding of the magneto M to the switch contact 10 for the purpose of grounding said primary winding, all in well known manner, for the purpose of stopping the magneto when the switch is in proper position. It will be seen by reference to Fig. 8, that with the switch lever 16 thrown to the left facing the switch that the battery circuit is closed through the coil and timer-distributer and the magneto is cut out of action by having its primary grounded. In Fig. 9, the switch lever 16 is positioned so that the lever 16 can be removed in this position, the battery circuit is opened and the magneto still remains grounded so that both ignition systems are out of commission. In Fig. 10, the switch lever is thrown to the right facing the switch which removes the ground from the magneto putting it in commission and holding the battery circuit open. It will be observed in Fig. 11, that the distributer of the timer-distributer is used for distributing the current from the high tension battery coil as well as from the magneto M. Such a system is particularly advantageous in various classes of work such as on trucks and aeroplanes, however, no claim is made for the system itself but rather for the improvements concerning the switch. It will be understood that various changes and alterations may be made in the details of the switch without departing from the spirit of the invention and the scope of the appended claims.

Having thus described my invention what I claim is:—

1. In an ignition switch, the combination of a casing and a cover therefor, a bushing in the bottom of said casing, a switch block within said casing, a stud carried by said switch block having one end adapted to seat in said bushing, a switch handle having a stud projecting therefrom and adapted to pass through said cover and engage the opposite end of the stud in said switch block, high tension contact terminals mounted in the upper half of said casing and low tension terminals mounted in the lower half of said casing and contact springs carried on said switch block for engaging the high and low tension contact terminals when said switch handle is operated as described.

2. In a device of the character described, the combination of a casing having terminals adapted to receive high and low tension current mounted therein, said terminals for the low tension current being arranged in two groups, a cover for said casing and means for holding the same thereto, a switch block and means for pivotally supporting the same in said casing, a switch handle adapted to removably engage said switch block for rotatively operating the same, said switch block carrying a contact spring member on one end adapted to connect two of said high tension terminals at a time and two sets of contact springs on its other end for engaging the said two groups of contacts as the switch handle is operated.

3. In a device of the character described, the combination of a casing having contacts in its upper half spaced relatively far apart and two groups of contacts in its lower half terminating in two different planes, a switch block pivotally carried in the casing, a cover for the casing, a switch handle having a part projecting through the cover and engaging the switch block and means for preventing the removal of the switch handle when in its operating positions, said switch block carrying a contact spring on one end for engaging not over two at a time of the widely spaced contacts and two sets of contact springs on its other end arranged in different planes corresponding to the arrangement of the said two groups of contacts in the casing.

4. In a device of the character described, the combination of a casing and a cover therefor with protecting means therebetween, a switch block pivotally mounted within the casing, a handle having a part adapted to project through the cover and to operatively engage the switch block and means for locking the handle in all its operative positions, contacts within the casing arranged in two sets, one set for high tension current and the other set for low tension current, the low tension set being arranged in two groups in different planes, a contact spring on one end of the switch block adapted to engage not over two at a time of the high tension contacts, two sets of springs arranged in different planes on the other end of the switch block for engaging the low tension contacts, said two sets of springs having substantially parallel arcuate knife contact engaging edges, for the purpose described.

5. In a device of the character described, the combination of a casing and a cover therefor with protecting means therebetween, a switch block pivotally mounted within the casing, a handle having a part adapted to project through the cover and to operatively engage the switch block and means for locking the handle in all its operative positions, contacts within the casing arranged in two sets, one set for high tension current and the other set for low tension current, the low tension set being arranged in two groups in different planes, a contact spring on one end of the switch block adapted to engage not over two at a time of the high tension contacts, two sets of springs arranged in different planes on the other end of the switch block for engaging the low tension contacts, said two sets of springs being similar and constructed of two members one longer than the other and each having arcuate knife contact engaging edges, the longer one having its arcuate knife edge extending slightly forward of the other as and for the purpose described.

6. In a device of the character described, the combination of a casing and a cover therefor with protecting means therebetween, a switch block pivotally mounted within the casing, a handle having a part adapted to project through the cover and to operatively engage the switch block and means for locking the handle in all its operative positions, contacts within the casing arranged in two sets, one set for high-tension current and the other set for low tension current, the low tension set being arranged in two groups in different planes, a contact spring on one end of the switch block adapted to engage not over two at a time of the high tension contacts, two sets of springs arranged in different planes on the other end of the switch block for engaging the low tension contacts, said two sets of springs having substantially parallel arcuate knife contact engaging edges, the contacts for the high tension current and the associated contact spring on the switch block having coacting means for making known to the operator when the switch handle has been moved from one position to another.

7. In a device of the character described, the combination of a casing a cover therefor with protecting means therebetween, a switch block pivotally mounted within the casing, a handle having a part adapted to project through the cover and to operatively engage the switch block and means for locking the handle in all its operative positions, contacts within the casing arranged in two sets, one set for high tension current and the other set for low tension current, the low tension set being arranged in two groups in different planes, one of said two groups of contacts having its switch engaging ends closer together on the inside of the casing than on the outside.

8. In a device of the character described, the combination of a casing and a cover therefor with protecting means therebetween, a switch block pivotally mounted within the casing, a handle having a part adapted to project through the cover and to operatively engage the switch block and means for locking the handle in all its operative positions, contacts within the casing arranged in two sets, one set for high tension current and the other set for low tension current, the low tension set being arranged in two groups, a contact spring on one end of the switch block adapted to engage not over two at a time of the high tension contacts, two sets of springs arranged on the other end of the switch block for engaging said low tension contacts, said two sets of springs having arcuate knife engaging edges, and the first mentioned contact springs having indentations for engaging its corresponding contacts so as to give notice of the position of the switch block as described.

9. In a device of the character described, the combination of a casing and a cover therefor, a switch block pivotally mounted within the casing, a handle having a part adapted to project through the cover and to operatively engage the switch block, contacts within the casing arranged in two sets, one set for high tension current and the other set for low tension current, the low tension set being arranged in two groups, a contact spring on one end of the switch block adapted to engage not over two at a time of the high tension contacts, two sets of springs on the other end of the switch block for engaging the low tension contacts, said two sets of springs having substantially parallel arcuate contact engaging edges, the outer ends of said edges being on a different arc from the center of said contact edges as and for the purpose described.

10. In a device of the character described, the combination of a casing and a cover therefor, a switch block pivotally mounted within the casing, a handle having a part adapted to project through the cover and to operatively engage the switch block, contacts within the casing arranged in two sets, one set for high tension current and the other set for low tension current, the low tension set being arranged in two groups, two sets of springs on one end of the switch block for engaging the low tension contacts and a contact spring on the other end of the switch block adapted to engage not over two at a time of the high tension contacts, said contact springs being arranged in a manner whereby the low tension circuits are controlled so that no high tension arc is produced at the high tension contacts.

In witness whereof, I affix my signature.

LEO J. WERNER.

Copies of this patent may be obtained for five cents each, by addressing the "Commissioner of Patents, Washington, D. C."